US012242406B2

United States Patent
Sivan et al.

(10) Patent No.: US 12,242,406 B2
(45) Date of Patent: Mar. 4, 2025

(54) SYSTEM AND METHOD FOR PROCESSING BETWEEN A PLURALITY OF QUANTUM CONTROLLERS

(71) Applicant: Quantum Machines, Tel Aviv (IL)

(72) Inventors: Itamar Sivan, Tel Aviv (IL); Yonatan Cohen, Tel Aviv (IL); Nissim Ofek, Tel Aviv (IL); Ori Weber, Tel Aviv (IL); Uri Abend, Tel Aviv (IL)

(73) Assignee: Q.M Technologies Ltd. (IL)

(*) Notice: Subject to any disclaimer, the term of this patent is extended or adjusted under 35 U.S.C. 154(b) by 969 days.

(21) Appl. No.: 17/316,114

(22) Filed: May 10, 2021

(65) Prior Publication Data

US 2022/0374378 A1 Nov. 24, 2022

(51) Int. Cl.
*G06F 13/40* (2006.01)
*G06F 9/30* (2018.01)
*G06F 11/10* (2006.01)
*G06N 10/40* (2022.01)
*G06N 10/70* (2022.01)

(52) U.S. Cl.
CPC ...... *G06F 13/4022* (2013.01); *G06F 9/30036* (2013.01); *G06F 11/1076* (2013.01); *G06N 10/40* (2022.01); *G06N 10/70* (2022.01)

(58) Field of Classification Search
CPC . G06F 13/4022; G06F 11/1076; G06N 10/40; G06N 10/70
See application file for complete search history.

(56) References Cited

U.S. PATENT DOCUMENTS

| | | |
|---|---|---|
| 4,875,484 A | 10/1989 | Anzai et al. |
| 5,063,354 A | 11/1991 | Lauper et al. |
| 5,194,907 A | 3/1993 | Hayashi |
| 6,223,228 B1 | 4/2001 | Ryan et al. |
| 6,426,984 B1 | 7/2002 | Perino et al. |
| 6,993,108 B1 | 1/2006 | Chi et al. |
| 7,451,292 B2 | 11/2008 | Routt |
| 7,535,931 B1 | 5/2009 | Zampetti et al. |
| 7,627,126 B1 | 12/2009 | Pikalo |
| 8,315,969 B2 | 11/2012 | Roetteler |
| 8,385,878 B2 | 2/2013 | Rao |
| 8,750,717 B1 | 6/2014 | Yap et al. |

(Continued)

FOREIGN PATENT DOCUMENTS

| | | |
|---|---|---|
| CA | 2420022 | 2/2003 |
| CN | 1808103 A | 7/2006 |

(Continued)

OTHER PUBLICATIONS

Int'l Preliminary Report on Patentability Appln No. PCT/IB2020/000218 mailed Sep. 16, 2021.

(Continued)

*Primary Examiner* — Eric Nilsson
(74) *Attorney, Agent, or Firm* — McAndrews, Held & Malloy, Ltd.

(57) ABSTRACT

A set of quantum controllers are operable to transmit quantum state data to a quantum control switch. The quantum control switch comprises vector processors that operate on the quantum state data from the set of quantum controllers. Each vector processor transmits a result of the operation to a corresponding quantum controller in the set of quantum controllers.

41 Claims, 12 Drawing Sheets

(56) References Cited

U.S. PATENT DOCUMENTS

| | | | |
|---|---|---|---|
| 9,207,672 B2 | 12/2015 | Williams | |
| 9,400,499 B2 | 7/2016 | Williams | |
| 9,509,324 B2 | 11/2016 | McDonald et al. | |
| 9,663,358 B1 | 5/2017 | Cory et al. | |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |
| 10,223,643 B1 | 3/2019 | Bishop et al. | |
| 10,333,503 B1 | 6/2019 | Cohen et al. | |
| 10,454,459 B1* | 10/2019 | Cohen | H03K 3/38 |
| 10,496,069 B2 | 12/2019 | Nazarathy et al. | |
| 10,505,524 B1 | 12/2019 | Cohen | |
| 10,560,076 B1 | 2/2020 | Cohen | |
| 10,637,449 B1 | 4/2020 | Cohen et al. | |
| 10,659,018 B1 | 5/2020 | Cohen | |
| 10,666,238 B1 | 5/2020 | Cohen | |
| 10,958,253 B1 | 3/2021 | Cohen et al. | |
| 10,985,739 B2 | 4/2021 | Cohen et al. | |
| 11,010,145 B1 | 5/2021 | Smith et al. | |
| 11,463,075 B2 | 10/2022 | Cohen et al. | |
| 11,616,497 B2 | 3/2023 | Cohen et al. | |
| 11,616,498 B2 | 3/2023 | Cohen et al. | |
| 2002/0004876 A1 | 1/2002 | Timmer et al. | |
| 2004/0266084 A1 | 12/2004 | Fujishima et al. | |
| 2005/0015422 A1 | 1/2005 | Kohn et al. | |
| 2005/0180575 A1 | 8/2005 | Maeda et al. | |
| 2006/0093376 A1 | 5/2006 | Mitchell et al. | |
| 2008/0037693 A1 | 2/2008 | Andrus et al. | |
| 2010/0072979 A1 | 3/2010 | Fefer et al. | |
| 2011/0035511 A1 | 2/2011 | Biederman | |
| 2013/0198499 A1 | 8/2013 | Dice et al. | |
| 2016/0125311 A1 | 5/2016 | Fuechsle et al. | |
| 2016/0267032 A1 | 9/2016 | Rigetti et al. | |
| 2016/0292586 A1 | 10/2016 | Rigetti et al. | |
| 2017/0094618 A1 | 3/2017 | Bjorkengren | |
| 2017/0214410 A1 | 7/2017 | Hincks et al. | |
| 2017/0364796 A1 | 12/2017 | Wiebe | |
| 2018/0013426 A1 | 1/2018 | Deurloo et al. | |
| 2018/0032893 A1 | 2/2018 | Epstein | |
| 2018/0091244 A1 | 3/2018 | Abdo | |
| 2018/0107579 A1 | 4/2018 | Chapman | |
| 2018/0123597 A1 | 5/2018 | Sete | |
| 2018/0237039 A1 | 8/2018 | Mong et al. | |
| 2018/0260245 A1 | 9/2018 | Smith | |
| 2018/0260730 A1 | 9/2018 | Reagor | |
| 2018/0260732 A1 | 9/2018 | Bloom | |
| 2018/0308007 A1 | 10/2018 | Amin | |
| 2018/0322409 A1 | 11/2018 | Barends | |
| 2018/0365585 A1 | 12/2018 | Smith | |
| 2018/0373995 A1 | 12/2018 | Tomaru et al. | |
| 2018/0375650 A1 | 12/2018 | Legre | |
| 2019/0042964 A1 | 2/2019 | Elsherbini et al. | |
| 2019/0042965 A1 | 2/2019 | Clarke | |
| 2019/0042966 A1* | 2/2019 | Hogaboam | G06F 12/1027 |
| 2019/0042970 A1* | 2/2019 | Zou | G06F 9/30101 |
| 2019/0042971 A1 | 2/2019 | Zou | |
| 2019/0042972 A1 | 2/2019 | Zou | |
| 2019/0042973 A1 | 2/2019 | Zou | |
| 2019/0049495 A1 | 2/2019 | Ofek | |
| 2019/0251478 A1 | 8/2019 | Bishop et al. | |
| 2019/0266512 A1 | 8/2019 | Shen et al. | |
| 2019/0302832 A1 | 10/2019 | Morgan et al. | |
| 2019/0317589 A1 | 10/2019 | Mathur et al. | |
| 2019/0385088 A1 | 12/2019 | Naaman et al. | |
| 2019/0392343 A1* | 12/2019 | Haah | G06F 17/12 |
| 2020/0293080 A1 | 9/2020 | Poon et al. | |
| 2020/0334104 A1* | 10/2020 | Rosenblum | G06N 10/00 |
| 2020/0364602 A1 | 11/2020 | Niu et al. | |
| 2021/0004707 A1 | 1/2021 | Gambetta et al. | |
| 2021/0103847 A1 | 4/2021 | Akzam | |
| 2021/0125096 A1 | 4/2021 | Puri et al. | |
| 2021/0359670 A1 | 11/2021 | Cohen et al. | |

FOREIGN PATENT DOCUMENTS

| | | |
|---|---|---|
| CN | 104467843 | 3/2015 |
| CN | 105281886 A | 1/2016 |
| CN | 105912070 A | 8/2016 |
| CN | 107408223 A | 11/2017 |
| CN | 108111306 A | 6/2018 |
| CN | 108594214 A | 9/2018 |
| CN | 108698815 A | 10/2018 |
| CN | 109165744 A | 1/2019 |
| CN | 110085094 A | 8/2019 |
| CN | 108780129 A | 11/2019 |
| CN | 110677210 | 1/2020 |
| CN | 111464154 | 7/2020 |
| CN | 111767055 A | 10/2020 |
| CN | 112019193 | 12/2020 |
| CN | 112149832 A | 12/2020 |
| EP | 0388052 | 9/1990 |
| JP | 2007049009 A | 2/2007 |
| JP | 2011175078 | 9/2011 |
| JP | 2012188875 | 10/2012 |
| WO | 2015178991 A2 | 11/2015 |
| WO | 2015178992 A2 | 11/2015 |
| WO | 2017078735 A1 | 5/2017 |
| WO | 2017123940 | 7/2017 |
| WO | 2017139683 A1 | 8/2017 |
| WO | 2018055607 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021/123903 | 6/2021 |

OTHER PUBLICATIONS

Int'l Preliminary Report on Patentability Appln No. PCT/IB2020/000376 mailed Nov. 12, 2021.

Int'l Search Report and Written Opinion Appln No. PCT/IB2021/056254 mailed Dec. 1, 2021.

Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).

Int'l Preliminary Report on Patentability Appln No. PCT/IB2020/000555 mailed Feb. 10, 2022.

Int'l Preliminary Report on Patentability Appln No. PCT/IB2020/000707 mailed Mar. 17, 2022.

Int'l Preliminary Report on Patentability Appln No. PCT/IB2020/000704 mailed Mar. 17, 2022.

Int'l Preliminary Report on Patentability Appln No. PCT/IB2020/000760 mailed Apr. 7, 2022.

Int'l Search Report and Written Opinion Appln No. PCT/IB2022/050190 mailed Apr. 11, 2022.

U.S. Appl. No. 62/294,966, filed Feb. 12, 2016.

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2- and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on

(56) References Cited

OTHER PUBLICATIONS second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4, pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.
Cross et al. "Open Quantum Assembly Language", Jan. 10, 2017.
European Office Communication with extended Search Report Appln No. 20766036.6 dated Nov. 24, 2022.

Japanese Patent Office Action Appln No. 2021-529723 dated Oct. 26, 2022 with translation.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
European Office Communication with extended Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang Yet al: "FPGA-based electronic system for the control and readout of superconducting qubit systems", arxiv.org, Cornell University Library, 201 Yang Yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.2019.00040 Retrieved from the Internet: URL: https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.
Chinese Patent Office Action Appln No. 2019800888907 with search report dated Jul. 28, 2023 with translation.
European Office Communication with extended Search Report Appln No. 20869503.1 dated Sep. 12, 2023.
Chinese Patent Office Action Appln No. 2019800902340 with search report dated Aug. 30, 2023 with translation.
Int'l Preliminary Report on Patentability Appln No. PCT/IB2022/050190 mailed Oct. 19, 2023.
Int'l Preliminary Report on Patentability Appln No. PCT/IB2022/000068 mailed Nov. 23, 2023.
Int'l Preliminary Report on Patentability Appln No. PCT/IB2022/000059 mailed Nov. 23, 2023.
Int'l Preliminary Report on Patentability Appln No. PCT/IB2022/000024 mailed Nov. 9, 2023.
Lavoie et al., "A Formalization for Specifying and Implementing Correct Pull-Stream Modules," in arXiv preprint arXiv: 1801.06144 (2018). (Year: 2018).
Fu et al., "A Microarchitecture for a Superconducting Quantum Processor," in 38.3 IEEE Micro 40-47 (2018). (Year: 2018).
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.

(56) References Cited

OTHER PUBLICATIONS

Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).

Int'l Search Report and Written Opinion Appln No. PCT/IB2022/000068 mailed Jul. 17, 2022.

D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).

* cited by examiner

SYSTEM AND METHOD FOR PROCESSING BETWEEN A PLURALITY OF QUANTUM CONTROLLERS

BACKGROUND

Limitations and disadvantages of conventional approaches to processing between quantum controllers will become apparent to one of skill in the art, through comparison of such approaches with some aspects of the present method and system set forth in the remainder of this disclosure with reference to the drawings.

BRIEF SUMMARY

Systems and methods are provided for processing between quantum controllers, substantially as illustrated by and/or described in connection with at least one of the figures, as set forth more completely in the claims.

DETAILED DESCRIPTION

Figure 1:
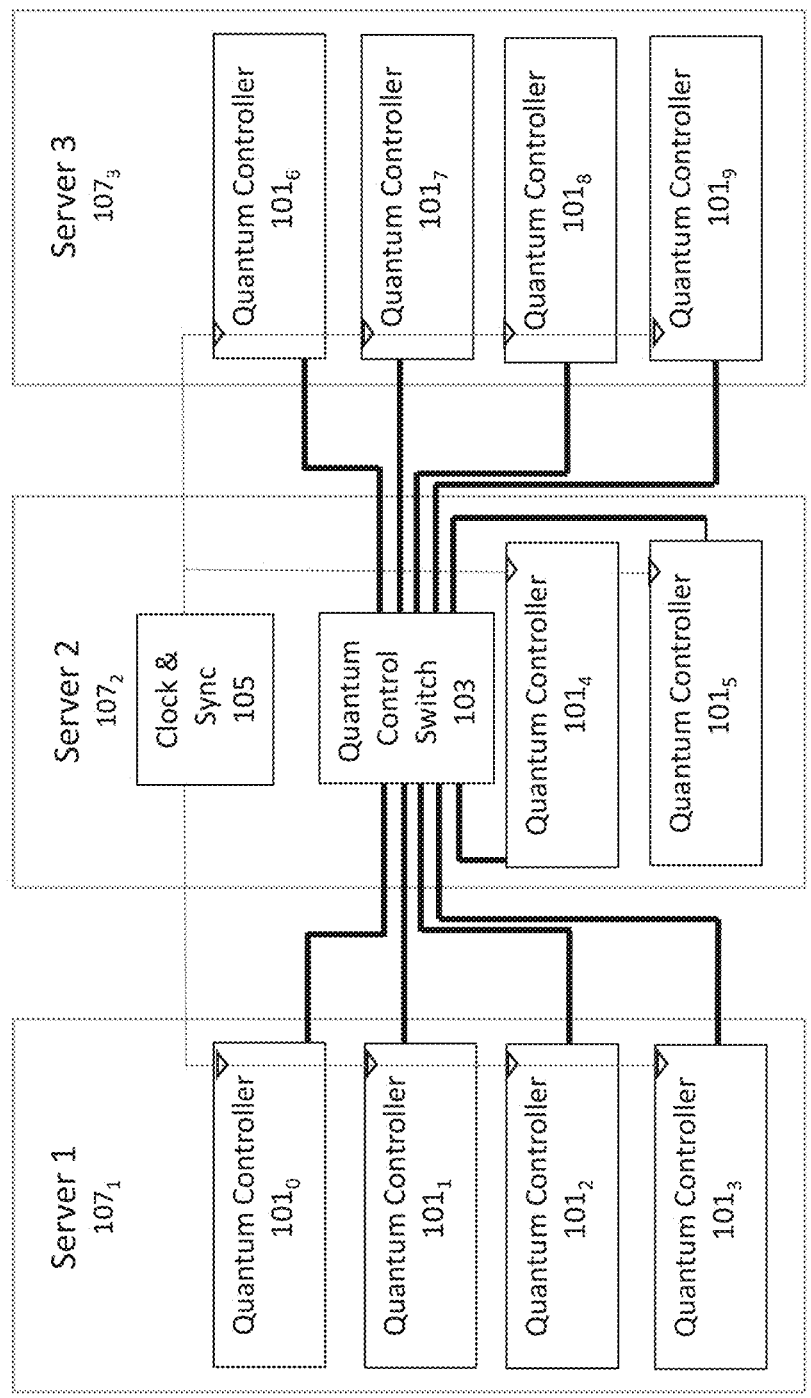
FIG. 1 illustrates an example system for processing between a plurality of quantum controllers (QCs) in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. The qubit state may be represented by $$\begin{bmatrix}\alpha\\\beta\end{bmatrix}.$$

The operations performed by the quantum gates are defined by linear algebra over a Hilbert space and the circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, and trapped ions.

A quantum orchestration platform (QOP) may comprise a quantum controller (QC), a quantum programming subsystem and a quantum processor.

It is the job of a QC to generate the precise series of external signals, usually pulses of electromagnetic waves and pulses of base band voltage, to perform the desired logic operations (and thus carry out the desired quantum algorithm).

The quantum programming subsystem comprises circuitry operable to generate a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QCs hardware can interpret and execute directly).

The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime.

A QC comprises a plurality of pulse processors, which may be implemented in a field programmable gate array, an application specific integrated circuit or the like. A pulse processor is operable to control outbound pulses that drive a quantum element (e.g., one or more qubits and/or resonators). A pulse processor is also operable to receive inbound pulses from a quantum element.

Each pulse processor may share data, metadata and computational values with one or more other pulse processors and make joint decisions regarding the control flow and the quantum data sent to the quantum elements. Pulse processors may, therefore, be operable synchronously. Because a QC only has a limited set of pulse processors, one QC may only be operable to control a quantum device with a limited number of quantum elements.

In some scenarios however, the quantum algorithm may require multiple pulse processors across a plurality of QCs to perform joint processing. A large number of parallel operations may be required across these multiple QCs.

As the size and complexity of quantum computers increases, the number of pulse processor must also increase. As a result, a quantum algorithm comprising of a large number of quantum elements may require multiple pulse processors across a plurality of QCs to perform joint processing.

FIG. 1 illustrates an example system for processing between a plurality of QCs in accordance with various example implementations of this disclosure. The system in FIG. 1 containing 10 QCs $101_x$ (where x=0 to 9), a quantum control switch 103 and a clock and sync distribution box 105. While the example in FIG. 1 illustrates 10 QCs, it is also envisioned that the number of QCs may be more or less than 10.

The QCs $101_x$ are connected to the quantum control switch 103 to enable communication between QCs $101_x$. The quantum control switch 103 allows an all-to-all mapping. The clock and sync distribution box 105 sends clock and sync to all QCs $101_x$ and the quantum control switch 103 so that all blocks may operate at the same frequency and phase and all blocks may generate the same time stamp. Each QC $101_x$ may be identical and connected to the quantum control switch 103 with a single line. Alternatively, multiple types of QCs $101_x$ may connect to the quantum control switch 103 in different setups. For example, a QC $101_0$ may be connected to the quantum control switch 103 with multiple channels to enable a higher aggregate bandwidth.

The pulse processors may control quantum elements (e.g., resonators and flux lines) associated with qubits in addition to controlling the qubits themselves. Each QC $101_x$ may have, for example, 32 pulse processors and may, therefore, control a quantum computer with 8 qubits and additional quantum elements, such as readout resonators and flux lines. Each QC $101_x$ may periodically perform state estimation of all the qubits it controls. The state estimation may be a binary value specifying whether the qubit is at ground state or excited state.

QCs may also be organized into a server rack. For example, a first server $107_1$ may house QCs $101_0$ to $101_3$, a second server $107_2$ may house QCs $101_4$ and $101_5$, and a third server $107_3$ may house QCs $101_6$ to $101_9$. The quantum control switch 103 and the clock and sync distribution box 105 may also be housed in the second server $107_2$.

The system illustrated in FIG. 1 allows 10 QCs $101_x$ (where x=0 to 9) to operate simultaneously and act as a single larger controller. The quantum control switch 103 between QCs $101_x$ allows each QC (e.g., $101_0$) to share information with other QCs (e.g., $101_1$ to $101_9$).

Achieving this via simple switch merely transferring data between pulse processors might be challenging as the data rate is limited. Such an approach is also inefficient as the same computation may take place at multiple quantum processors with the same data, consuming valuable resources.

A more beneficial approach is to gather the information inside the quantum control switch 103 from all QCs $101_0$ to $101_9$ and to dispatch the computation results back to the QCs $101_0$ to $101_9$ in synchronized fashion.

Figure 2:
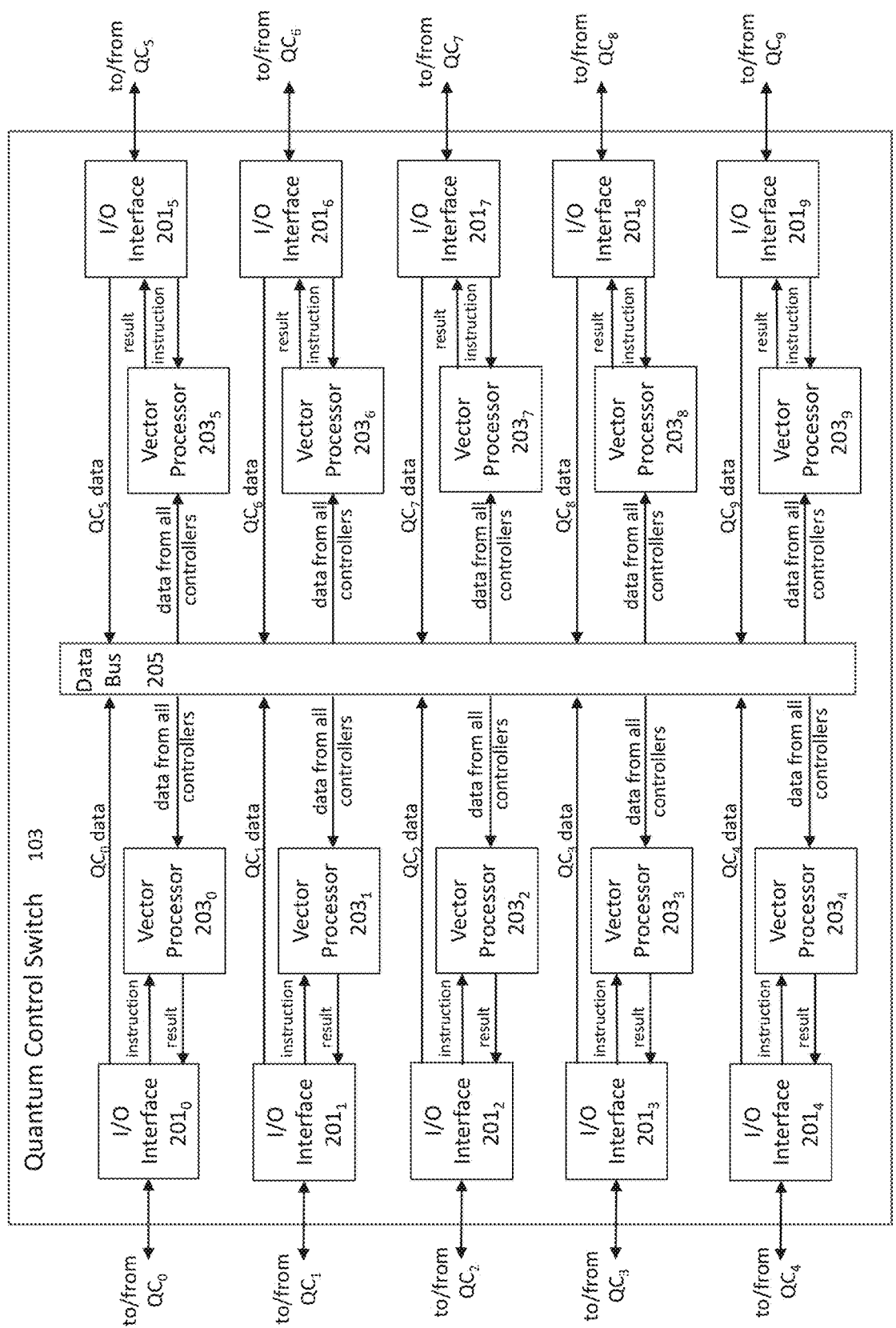
FIG. 2 illustrates an example quantum control switch for use in a system for processing between a plurality of QCs in accordance with various example implementations of this disclosure.

FIG. 2 illustrates an example quantum control switch 103 for use in a system for processing between a plurality of QCs $101_0$ to $101_9$ in accordance with various example implementations of this disclosure. The quantum control switch 103 comprises a plurality of I/O interfaces $201_0$ to $201_9$—one connecting each of the plurality of QCs $101_0$ to $101_9$ to a corresponding vector processor $203_0$ to $203_9$ respectively. The I/O interfaces $201_0$ to $201_9$ transmit and receive data in every clock cycle to and from their corresponding QCs $101_0$ to $101_9$.

The joint computation circuitry (comprising vector processors $203_0$ to $203_9$ and data bus 205) receives the inputs from all the QCs $101_0$ to $101_9$. The vector processors $203_0$ to $203_9$ perform a set of processing computations and return results to the participating QCs $101_0$ to $101_9$.

Figure 3:
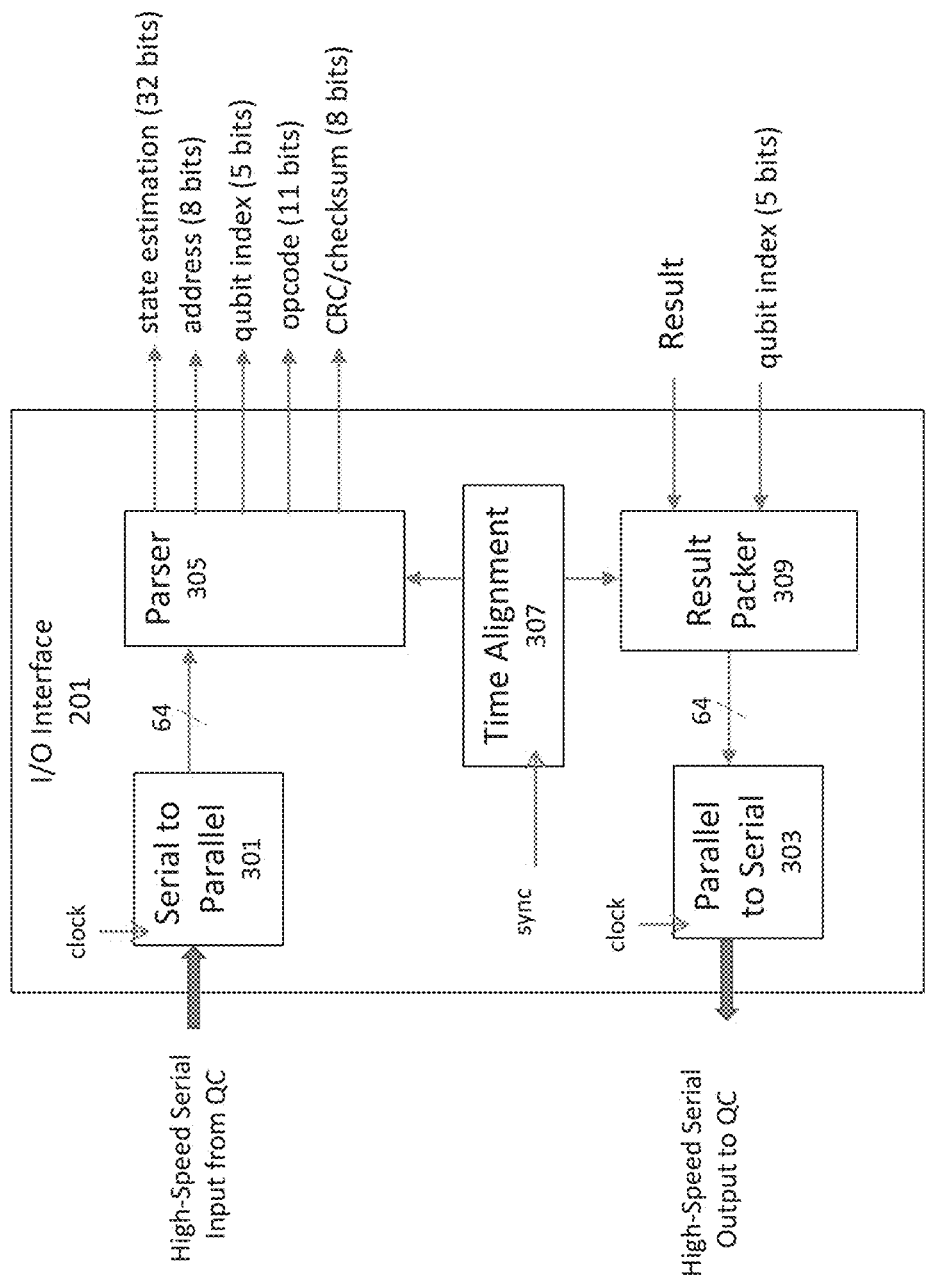
FIG. 3 illustrates an example I/O interface for use in a system for processing between a plurality of QCs in accordance with various example implementations of this disclosure.

FIG. 3 illustrates an example I/O interface 201 for use in a system for processing between a plurality of QCs in accordance with various example implementations of this disclosure. The I/O interface 201 may have a known, low, fixed latency and a high bandwidth (e.g., 16 or more gigabits/sec), which allows multiple QCs $101_0$ to $101_9$ to share large amount of information in deterministic fashion in real time during their operation. A high speed SERDES may act as such interface. Two are needed to implement full duplex channel. For example, a first SERDES 301 will deserialize information received from a QC, and a second SERDES 303 will serialize information being transmitted to a QC. Dedicated hardware and logic implementing a crossbar switch may be used to allow the number of I/O's to scale-up as the number of QCs scale.

During operation, each QC $101_x$ may send high-speed serial data to the quantum control switch 103. This data may include the state estimation of a plurality of qubits and an instruction. For example, the data sent to the quantum control switch 103 for a particular QC may comprise the following fields: a state estimation sequence vector, a memory address, a qubit index, an opcode specifying which operation to perform, and a CRC/checksum to validate data integrity. A parser 305 receives data from the QC via the first SERDES 301 and process it to produce the various fields. The state estimation sequence may be realized, for example, as an integer, a real number, a sequence of bits, a floating point representation, and/or a two's-complement representation. The state estimation sequence may represent, for example, the quantum element readout response that is demodulated over time. The state estimation sequence may be used to deduce a multiple qubit joint state. The present disclosure is also not limited to operations on a state estimation vector.

A result packer 309 receives result from the joint computation circuitry and packs the result and the qubit index. The packed data is then sent to the corresponding QC via the second SERDES 303. The packer 309 may also include the CRC/checksum, which the switch 103 will transmit back to the QC as an error indication. The CRC/checksum may indicate an error in the QC to switch 103 transmission, as well as any other error in the switch circuitry. The switch 103 may be informed if an error occurred in the communication itself in either direction. The switch 103 may retransmit in response to an error indication.

The I/O interface 201 also utilizes a time alignment circuit 307 that takes into account a calibrated/deterministic latency.

The vector processors $203_0$ to $203_9$ (of FIG. 2) may implement a large range of processing operations. Each vector processor $203_0$ to $203_9$ may comprise identical circuitry. Alternatively, each vector processor $203_0$ to $203_9$ may be customized to perform specific operations (per the instruction input from one QC) according to the data from a plurality of QC's. The data from the plurality of QC's may comprise state estimation information or other information related to the control of one or more qubits.

Figure 4:
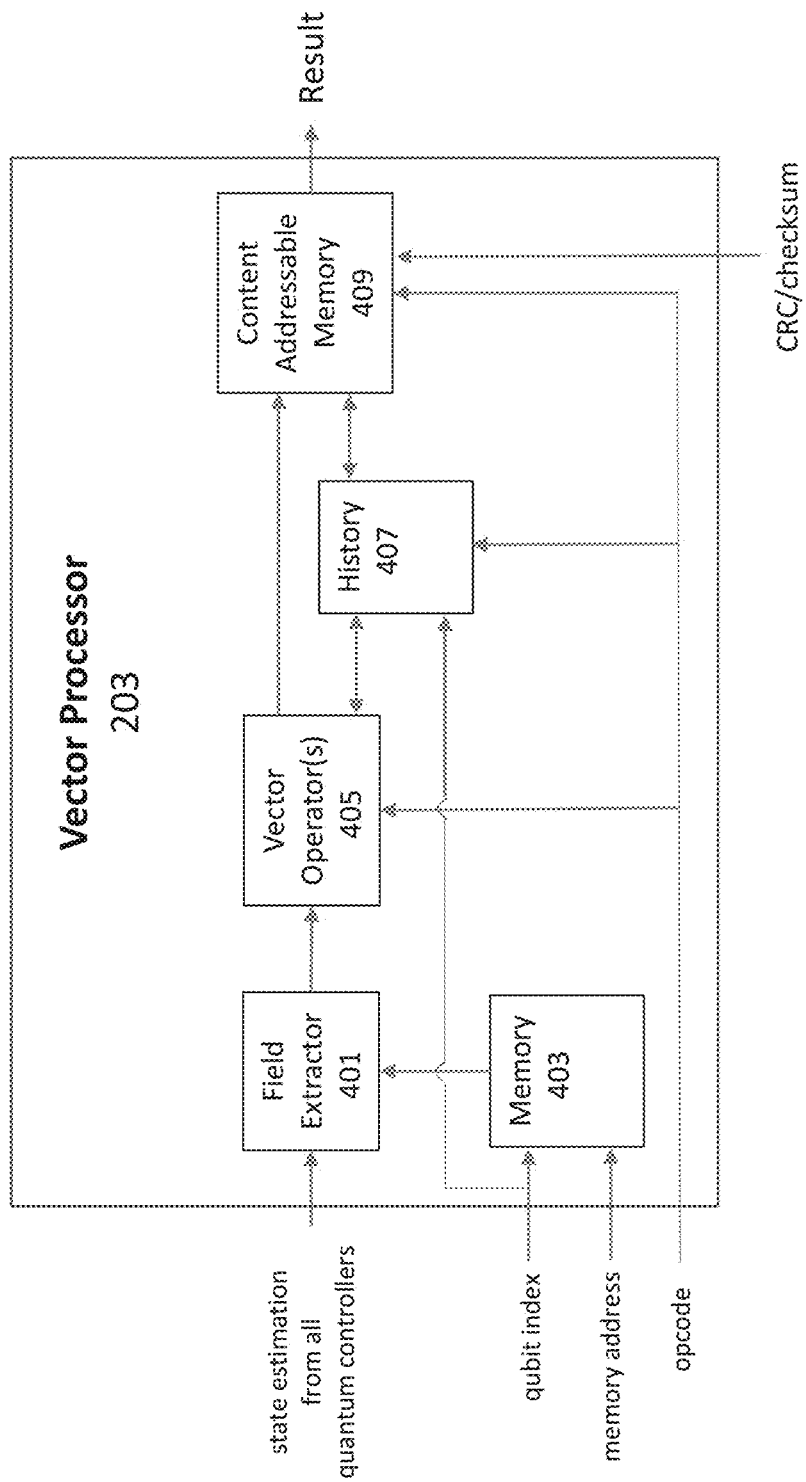
FIG. 4 illustrates an example vector processor for use in a system for processing between a plurality of QCs in accordance with various example implementations of this disclosure.

FIG. 4 illustrates an example vector processor 203 for use in a system for processing between a plurality of QCs in accordance with various example implementations of this disclosure. In this particular example, vector processor 203 receives the qubit index, all the state estimation vectors (e.g., 10 state estimation sequence vectors), the address, the opcode, and any additional information such as a CRC/checksum from the respective interface.

The state estimation sequence from each QC may stay fixed for several cycles. The qubit index may change every cycle to specify that the vector processor 203 will compute the specified operation required for a different qubit. The memory address and opcode are algorithm specific. The qubit index may be used to retrieve a set of previous sequence vectors from the history memory 407 or register set.

The memory address together with the qubit index sent to the memory 403 may be used for retrieving information about how to select a particular set of bits from the state estimation vectors. The field extractor 401 would construct the vector before processing based on the information gathered from the memory.

The history memory would retrieve a set of previous values based on the qubit register and would be sent to the vector operator.

The vector operator(s) 405 prepare the data in a desired pattern (e.g., change polarity, reorder the bits, perform arithmetic computation, manipulate the pattern based on the history vector) and may store the result in history memory 407. The required operation is governed by the opcode. While the qubit index is iterated for a set of state estimation values, the current value at each qubit index may be stored for the next iteration of the same qubit index.

The received pattern would enter a content addressable memory (CAM) 409 which will search for a proper action based on the input vector. Such action as well as the qubit index is sent back to the QC. The action may comprise an integer specifying an error or operation required to correct an error or an address of such operation in the QC. The QC may then perform an operation on the particular qubit according to the returned action/result. After several cycles of parallel switch operations with different qubit index, all the required data of each QC will be available for the next stage of a quantum algorithm.

The received pattern entering the CAM 409 also updates the history memory 407 at the qubit index entry, flushing the oldest value. The received pattern entering the CAM 409 may be dependent in the current history. The pattern may contain information according to the history of an operation several iterations earlier, depending on the memory bus width.

Figure 5:
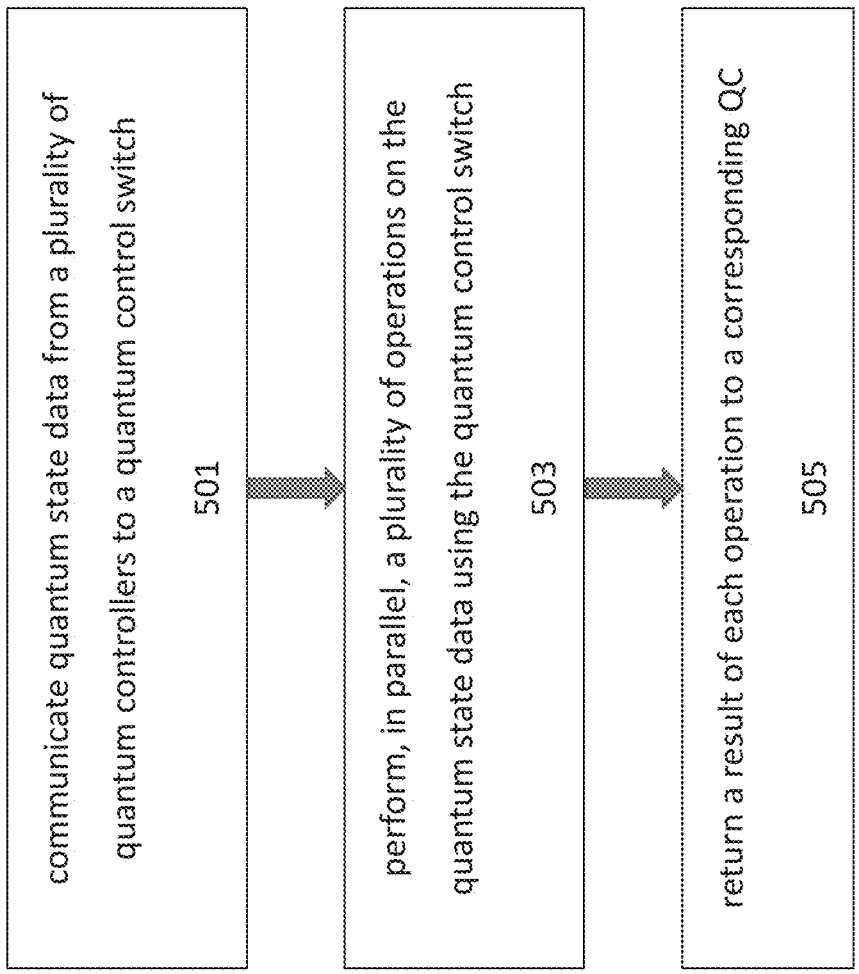
FIG. 5 illustrates a flowchart of an example method for processing between a plurality of QCs in accordance with various example implementations of this disclosure.

FIG. 5 illustrates a flowchart of an example method for processing between a plurality of QCs in accordance with various example implementations of this disclosure.

At 501, quantum state data is communicated from a plurality of QCs to a quantum control switch. The quantum state data from each QC comprises a quantum state estimate for each of the plurality of qubits. The quantum state data may be communicated serially at a 16 gigabit per second or faster. An interface of the quantum control switch is operable to time align the quantum state data from each QC and provide the quantum state data in a vector form. The interface is also operable to time align each quantum state data vector with the other quantum state data vectors. Because the interface and state estimation operation have a deterministic latency, the joint computation operation may be fully integrated with the QC operation as part of a complex quantum algorithm. In certain scenarios, the communication latency may be lowered at the expense of having no classical error correction and/or having only error detection.

At 503, a plurality of operations are performed in parallel on the quantum state data using the quantum control switch. Each operation performed in a vector processor is configured according to an instruction that may be received from a corresponding QC. Each operation is also performed according to a qubit index that changes while the quantum state data and the instruction remain the same.

At 505, a result of each operation is returned to the corresponding QC. Prior to transmission to the QC, the result for each qubit index may be packed into a vector. The packed vector may be communicated serially to the corresponding QC at a 16 gigabit per second or faster.

A joint computation may be used to enable many QCs to operate as a large quantum computer to perform general computations on one or more pulse processor data vectors. Such joint computation may, for example, provide quantum error correction.

A qubit holds information that is in the form of a fragile superposition of two energy states. To facilitate quantum computation, the fidelity of this information must be maintained, while performing quantum logical operations on the data. This motivates the use of Quantum Error Correction (QEC) methods, much like the way in which "classical" bits are encoded to protect from errors when saved to a memory or transmitted through a noisy channel.

Figure 6:
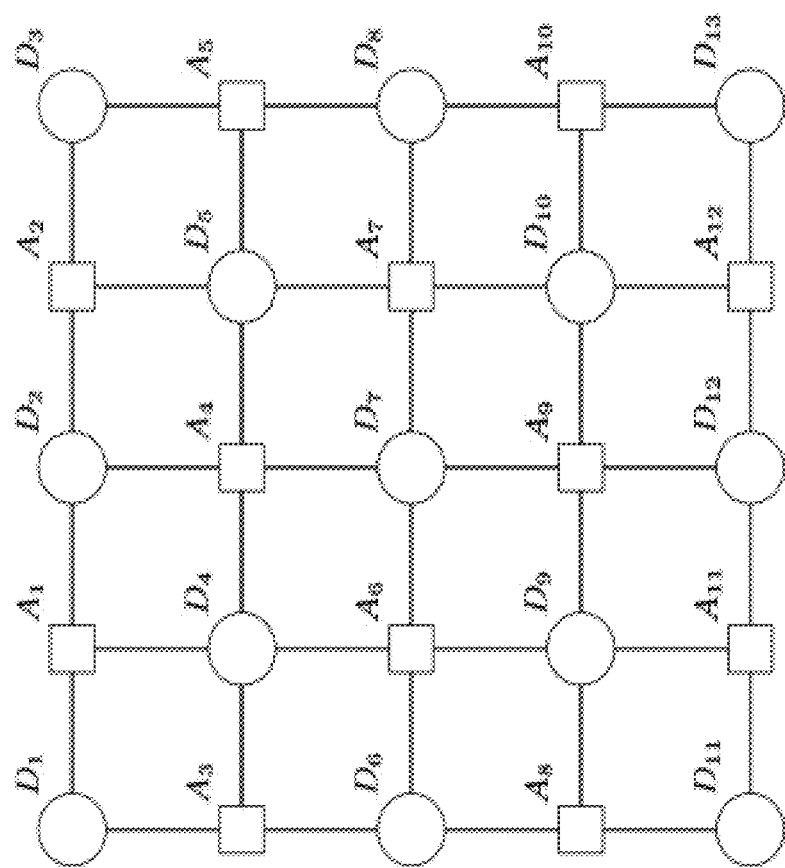
FIG. 6 illustrates an example of an error correction algorithm running on a qubit control system in accordance with various example implementations of this disclosure.

FIG. 6 illustrates an example of an error correction algorithm running on a qubit control system in accordance with various example implementations of this disclosure.

The QEC may use, for example, a surface code or a cat code. The surface code in FIG. 6 uses a total of 25 qubits, 13 for data encoding (circles) and 12 ancilla qubits used for measurements of the data qubits (squares).

This code enables correction of one arbitrary error in a data qubit, manifesting in a bit flip error (X error), $\alpha|0\rangle + \beta|1\rangle \Rightarrow \beta|0\rangle + \alpha|1\rangle$, phase flip error (Z error), $\alpha|0\rangle + \beta|1\rangle \Rightarrow \alpha|0\rangle - \beta|1\rangle$, or a composition of them (Y error).

The correction capability of the surface code in FIG. 6 is 1, which means only 1 arbitrary qubit error in this 5×5 grid is guaranteed to be correctable. In some cases it is possible to correct more errors, depending on the error type and location, but the correction of multiple errors is not guaranteed and depends on the error topology (the distance between different errors). Such a block containing 25 physical qubits may construct 1 logical qubit.

For example, if a QC controls 2 lines in the 5×5 grid (5 data qubits, 5 measurement qubits), the entire system contains 10 logical qubits, requiring 25 QCs to control all physical qubits in the system. Note that the ancilla qubits of different logical qubits are not connected. This means that the ancilla qubits in the boundaries of the grid are connected to 3 data qubits only.

For each logical qubit, the 13 data qubits are set to some desired (entangled) state. The 12 ancilla qubits may be set to 0 at the beginning of the algorithm's operation. Note that the codebook (i.e., the 13 data qubit states denoting logical |0⟩ and logical |1⟩) is constructed such that a zero state in the ancilla qubits indicates zero errors in the data qubits. This means that if we read |0⟩ for every ancilla in a logical qubit at some iteration, there are no errors in the logical qubit. This methodology enables error detection over multiple measurement cycles, as will be shown promptly.

Having set logical qubits to their desired state, all ancilla qubits are repeatedly readout of to identify errors in the code, until the resumption of the algorithm. For example, if logical qubit 0 is set and the operation of other logical qubits is still ongoing, then qubit 0 would be protected for errors. Another example is that all logical qubits were set to a desire state, and a correction phase would now take place to identify and correct all errors that occurred in that phase, if any.

The algorithm dictates that the state estimation in a ¾ qubit gate operation is performed via each of the 12 ancilla qubits. That is, a quantum control switch receives the 12 measurements of the ancilla qubits of all relevant logical qubits. This 12 bit vector is known as the syndrome of the code For each syndrome, the quantum control switch will detect Z and X type errors at a data qubit according to measurements at ancilla qubits adjacent to it. That is, if an X error occurs at a data qubit, the Z type ancillas connected to it will measure "1", and if a Z error occurs, the X type ancillas will measure "1". Note that X and Z errors (and their composition, which yields a Y type error) cover all possible rotations of a qubit. Once a measurement is made, the wave function collapses into one of the said states, namely, no error, X error, Z error or their composition.

Multiple measurement cycles are required to facilitate error detection either at the ancilla qubits or at their readout. That is, if an ancilla measures "1" followed by a "0" at the next measurement, without a correction cycle between, a measurement error will be identified—instead of a data error.

Note that if the measurement cycles are close enough in time, and assuming errors are sparse enough for the strength of the error correction code, large epochs of time may pass between correction sequences as the quantum control switch can adjust the expected ancilla measurements according to the errors it already measured. For example, once an X type error has been detected at a data qubit, the quantum control switch may adjust the expected measurements of the Z ancilla qubits connected to the corrupted data qubit to "1" instead of "0". That is, as long as the measurements are recorded, no correction needs to be initiated, thereby allowing the correction sequences to be scheduled at times when the system resources are available.

The expected patterns for errors in data qubits in the interior of the lattice and on its edges may be defined.

For example, if data qubit D7 suffers from an X error at some measurement cycle n, the two Z ancilla qubits connected to it, A4 and A9, will measure $A_{4,9}[n]=\overline{A_{4,9}[n-1]}$, where the $\overline{()}$ denotes the logical NOT operation (assuming this is the only error that occurred in the span of a single measurement). Similarly, a Z error in D7 will result in A6 and A7 measuring $A_{6,7}[n]=\overline{A_{6,7}[n-1]}$, and, a Y error in D7 will result in inverted measurements compared to the previous cycle in all the ancilla qubits, namely, A4, A6, A7 and A9.

For data qubits on the edges, the measurements will be similar, just for a smaller number of qubits. For example, Z errors on D1 will result in A1 measuring $A_1[n]=\overline{A_1[n-1]}$, and X errors on D1 will result in A3 measuring $A_3[n]=\overline{A_3[n-1]}$.

Measurement errors, stemming either from faulty measurements or errors in the ancilla qubits, will be detected through multiple measurements. That is, if an ancilla measures "1" and in the repeating cycle measures "0" without a correction cycle or other changes in the syndrome, the algorithm deduces a measurement error. Data qubit measurement will result in having 2 ancilla qubits changing their value for all iterations until next error. Ancilla qubit state estimation error would be transient and would not affect the next iteration.

A measurement error will prevent the detection of an error in a data qubit attached to this ancilla for the specific iteration. However, the data qubit error would be detectable in the next iteration.

After each correction sequence, if errors are merely recorded and not actually corrected during the quantum program, then the last must be kept until the next multi-cycle measurement. This is done to allow the measurement of ancilla errors through correction cycles.

To implement the 5×5 surface code in the system of FIG. 1, 25 QCs 101 would be coupled to the quantum control switch 103. Each QC 101 controls 5 data qubits and 5 measurement qubits. At every measurement cycle, each QC 101 sends a 5-bit state estimation sequence of the 5 ancillas it controls. Each QC 101 would also toggle the qubit index from 1 to 5 for the 5 data qubits it controls.

The memory address and the qubit index would point to a memory entry in memory 403 of FIG. 4, for example. This entry would be used to fetch (e.g., from field extractor 401 of FIG. 4) the relevant indices of the state estimation required to process.

In the following example, the measuring of errors on data qubit D7 in logical qubit 3 are described with reference to FIG. 1 and FIG. 6. QC1 $101_0$, QC2 $101_1$ and half of QC3 $101_2$ control logical qubit 1. Half of QC3 $101_2$, QC4 $101_3$ and QC5 $101_4$ control logical qubit 2. QC6 $101_5$, QC7 $101_6$ and half of QC8 $101_7$ control logical qubit 3. Therefore, QC7 $101_6$ controls lines 3 and 4 in logical qubit 3 and data qubit D7 (in FIG. 6) in logical qubit 3 is actually data qubit 2 from the point-of-view of QC7 $101_6$.

To check errors in D7 of logical qubit 3, QC7 $101_6$ will set the qubit index to "2". The relevant ancillas for checking errors for D7 of logical qubit 3 are A4, A6, A7 and A9 of logical qubit 3, which are globally (12 ancillas per logical qubit)->A26, A28, A29 and A31. The memory 403 (FIG. 4) returns 4 indices 26, 28, 29 and 31. The field extractor 401 (FIG. 4) fetches a vector of 4 ancilla state estimations from the state estimation vector according to the respective indices.

The vector operator 405 (FIG. 4) receives the extracted 4-bit vector and another 4 bits from the history memory 407 representing the previous ancilla values in the previous measurement cycle for this qubit index. The vector operator 405 (FIG. 4) performs an XOR operation between the two 4-bit vectors so that flipped bits would denote "1" and bits that have not changed since the last measurement iteration would remain "0". Note that this operation does not occur in the first measurement iteration of a surface code operation, as in that case the 4 bits from the history relate to the last surface code iteration of an earlier step in the algorithm. Also, if the error of the last iteration was already corrected, this history is outdated and should not be used.

The CAM 409 (FIG. 4) receives a 4-bit vector from the vector operator 405 (FIG. 4) and checks for specific patterns. The CAM 409 (FIG. 4) may return, for example, '1001' for a X error, '0110' for a Z error, '1111' for a Y error, '0000' for no error and any other pattern would indicate a measurement error. The history memory 407 (FIG. 4) is updated by this 4-bit vector in the qubit index entry to be stored for the next iteration. In case of a measurement error and depending on the opcode, the 4-bit vector may not be stored as the measurement error may obscure an actual error, and the previous value may remain for the next iteration.

In this manner, each logical qubit that enters the surface code phase triggers the respective QCs 101 (FIG. 1) to send through their I/O interface channel 201 (FIG. 2) to the quantum control switch 103 (FIGS. 1 and 2) the 5 bit ancilla state estimation. The respective QCs 101 (FIG. 1) toggle the qubit index to receive the result for each of their 5 data qubit. Note that if a QC is controlling 2 parts of logical qubits and only one is in the surface code phase, the QC may disregard the results of some of the qubits.

In case of a checksum error reported by the quantum switch back to the QCs (in either direction), the QC may retransmit the relevant information for recalculation.

For data qubits at the boundary, the memory may point to some indices more than once. For instance, to check an error of D4, only A3 (X), A6 (Z) and A8 (X) are required. Therefore, A6 may appear twice in the memory such that a Z error would appear as '0110' and a Y error as '1111' just for the case away from the boundary.

Each QC registers a received error. If a QC wishes to correct the error, it resets the state and informs the quantum control switch 103 (FIGS. 1 and 2) not to use the history of the previous iteration in the next iteration.

This 5×5 lattice form can be extended to support a larger number of errors in a measurement cycle.

FIGS. 7A-7F illustrate examples of detection patterns in a 9×9 surface code in accordance with various example implementations of this disclosure. The 9×9 algorithm differs from the detection algorithm in the smaller surface code when there are errors in adjacent qubits, i.e., qubits connected to the same ancilla qubit.

Thus, a 9×9 grid consisting of 41 data qubits (circles) and 40 ancilla qubits (squares), forming a single logical qubit, is able to detect and correct 2 arbitrary errors. The decoding follows the same principles as in the 5×5 example. X and Z type errors are detected separately with their respective ancilla measurements (with a Y error detected by the combination of both of them). Errors are attributed to the shortest path that explains them, using, for example, the minimum-weight perfect matching (MWPM) algorithm.

Figure 7A:
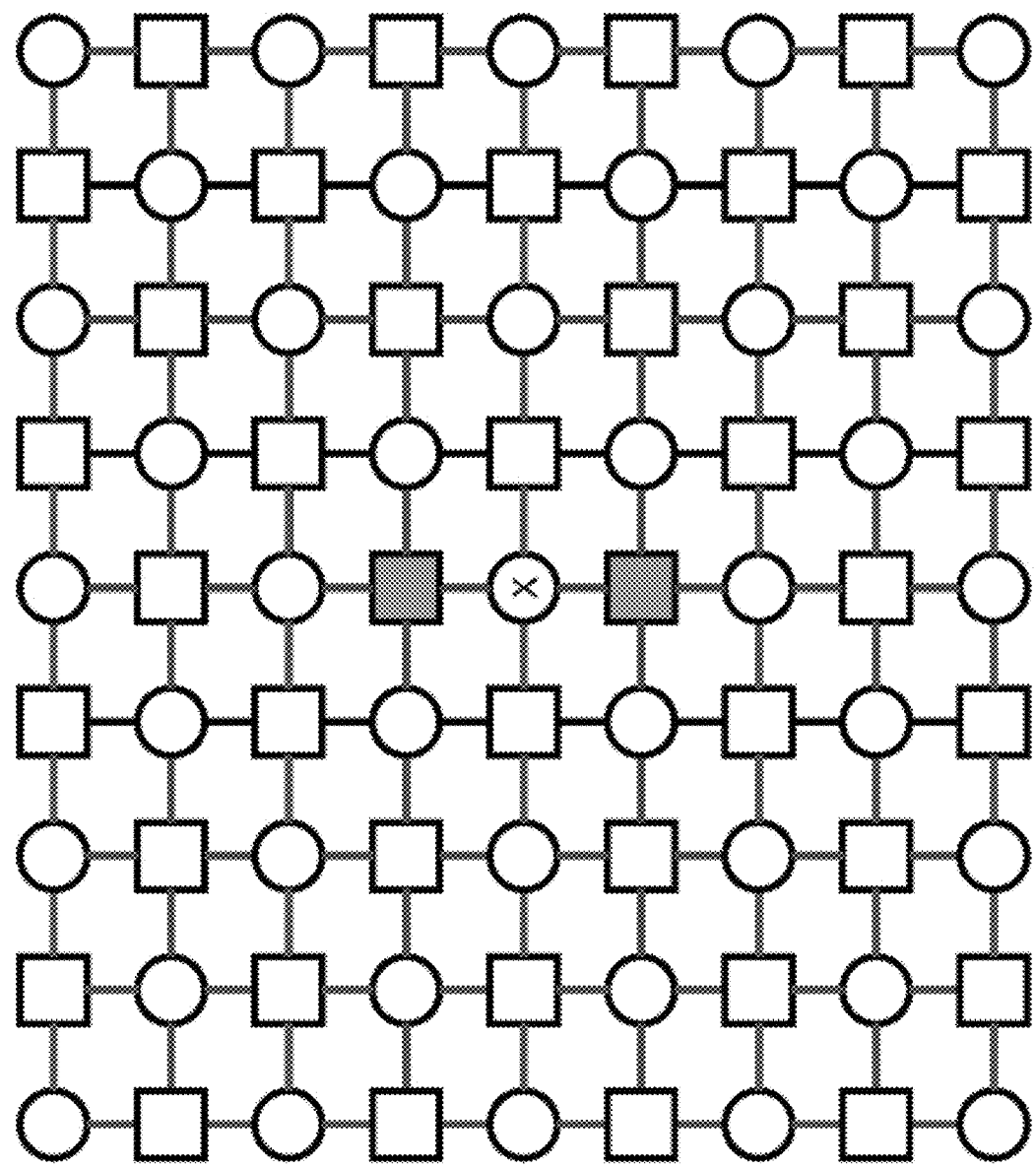
FIG. 7A-7F illustrate examples of detection patterns in a 9×9 surface code in accordance with various example implementations of this disclosure.
Figure 7B:
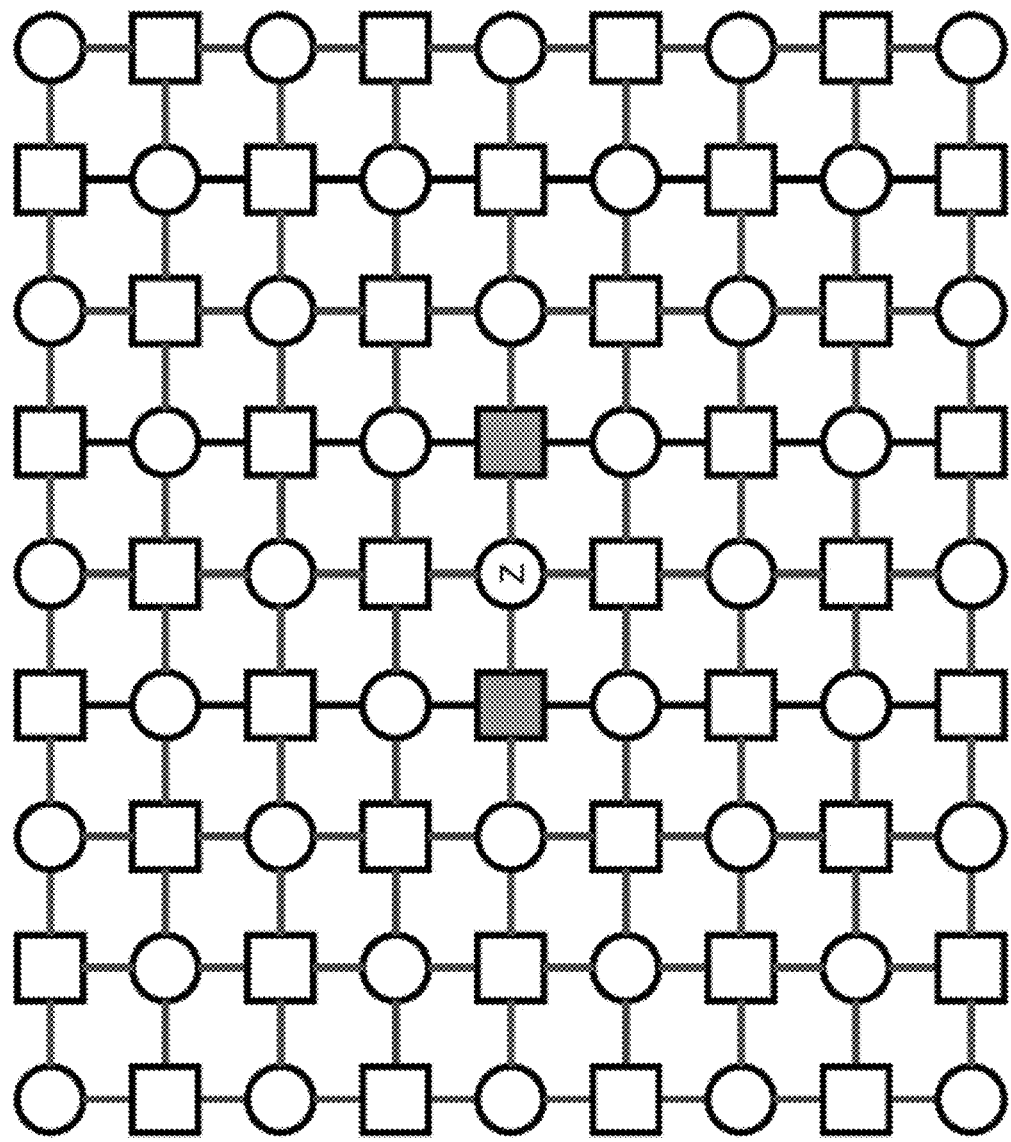
Figure 7C:
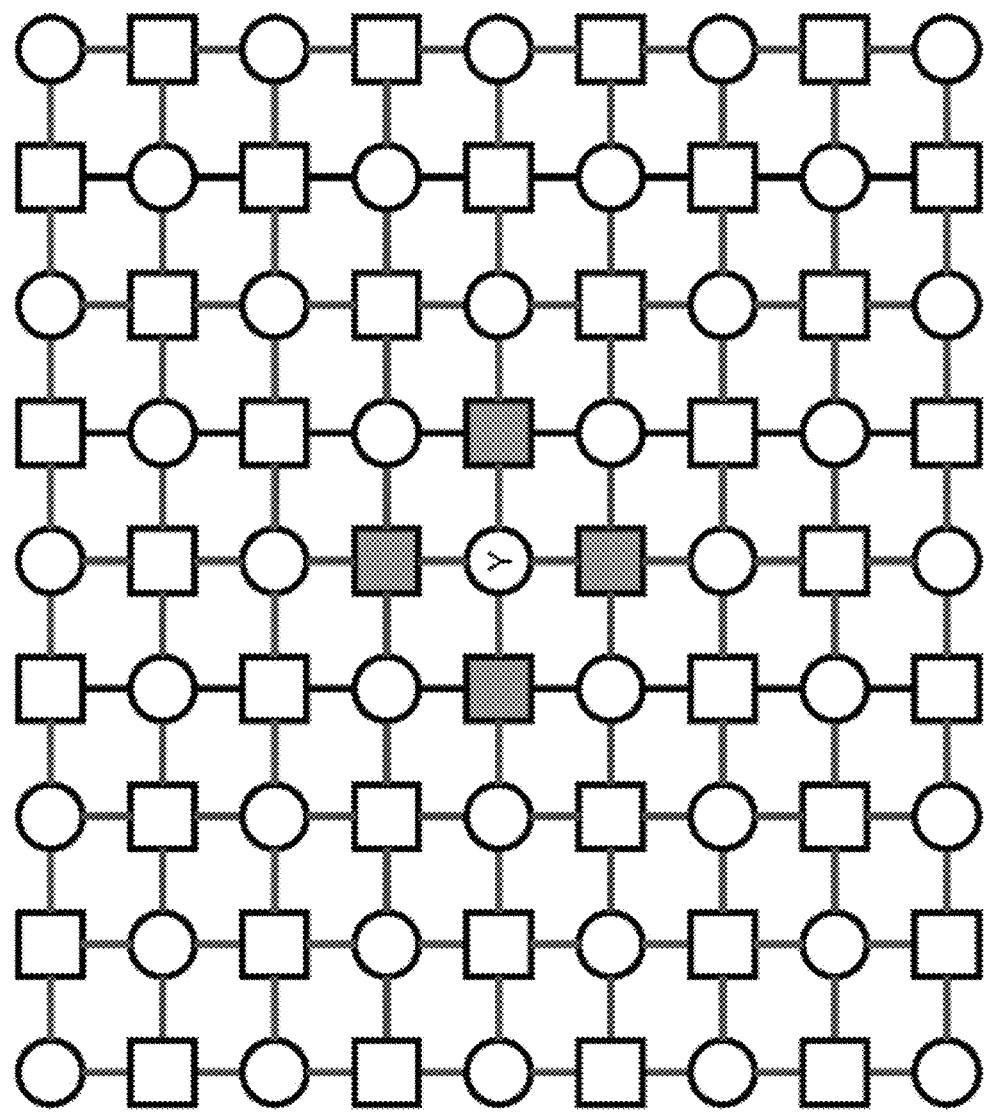

FIG. 7A illustrates a detection pattern of a single X error in a 9×9 surface code. FIG. 7B illustrates a detection pattern of a single Z error in a 9×9 surface code. FIG. 7C illustrates a detection pattern of a single Y error in a 9×9 surface code. When looking at the 4 ancilla patterns of one specific data qubit, the error pattern look the same as the 5×5 grid. Moreover, if the 9×9 grid contains 2 data errors that are not adjacent qubits, the error pattern look the same as the 5×5 grid.

However, if the data qubits in error are adjacent, the patterns to look for may require a longer path. The 9×9 grid processing takes place over 8 bits instead of 4 and more patterns are matched into errors in the CAM for every data qubit.

In this example, the 8 bit pattern that enters the CAM for each data qubit is achieved by scanning all the ancilla qubits from north to south, and west to east and is therefore listed as follows: {$2^{nd}$ ancilla above the data qubit, 1st ancilla above the data qubit, $2^{nd}$ ancilla to the left of the data qubit, 1st ancilla to the left of the data qubit, 1st ancilla to the right of the data qubit, $2^{nd}$ ancilla to the right, 1st ancilla below the data qubit, $2^{nd}$ ancilla below the data qubit}

For example, an X error for a data qubit away from the boundaries in the lattice would have a pattern of '01000010' (no additional X errors near the data qubit, similar to 5×5 grid) or '10000010' (the data qubit above also has an X error) or '01000001' (the data qubit below also has an X error) or '10000001' (the data qubits above and below has an X error). Similarly '00011000', '00101000' and '00100100' are the equivalent Z errors and the unification of both would generate Y errors.

Figure 7D:
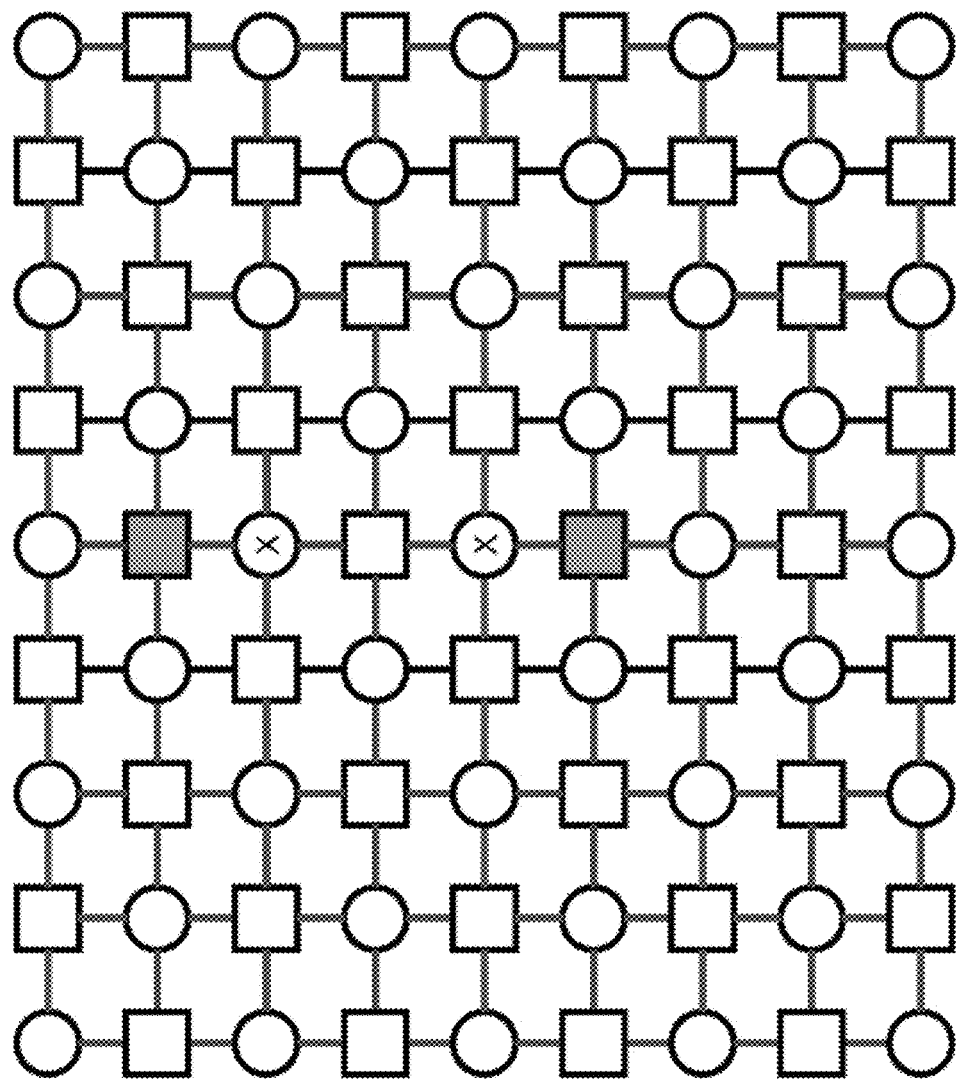
Figure 7E:
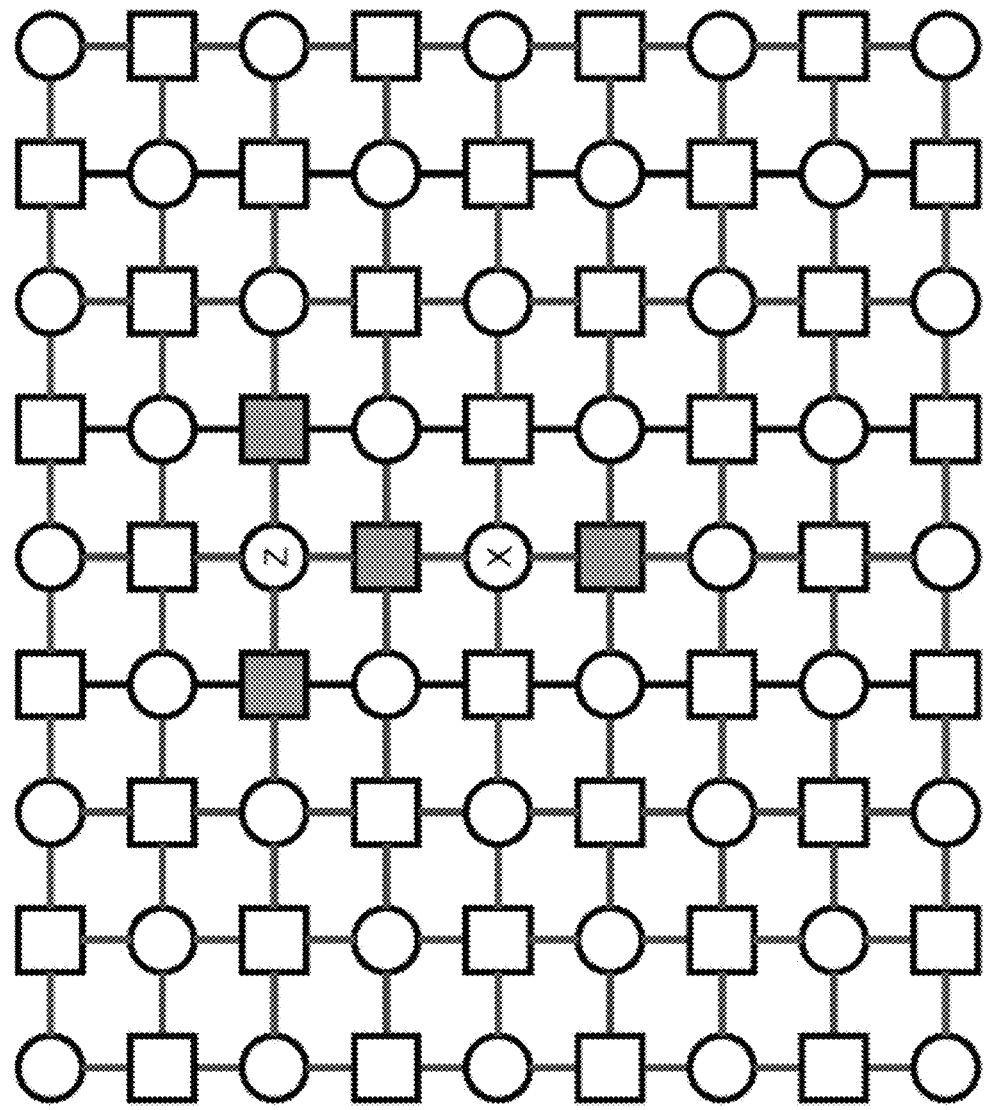
Figure 7F:
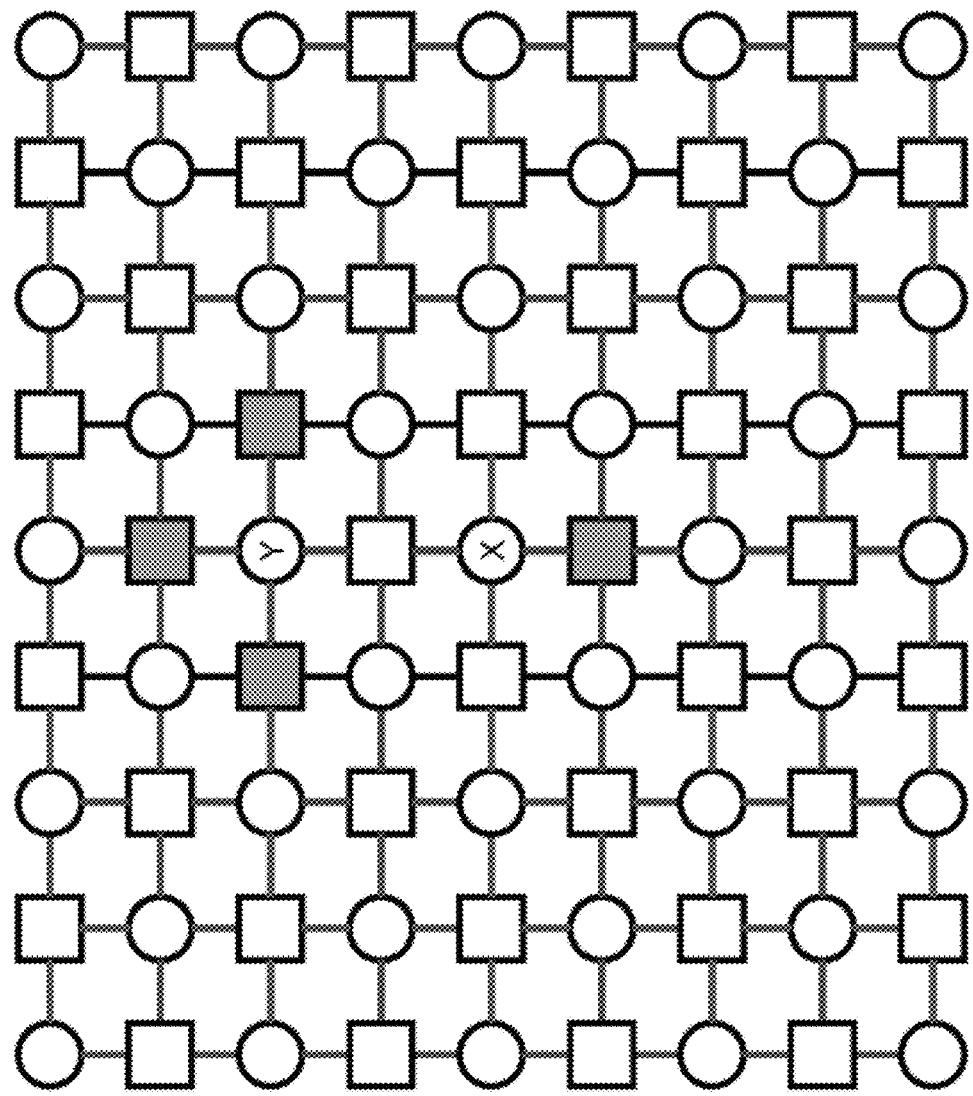

FIG. 7D illustrates a detection pattern of adjacent X errors in a 9×9 surface code. FIG. 7E illustrates a detection pattern of a Z error adjacent to an X error in a 9×9 surface code. FIG. 7F illustrates a detection pattern of a Y error adjacent to an X error in a 9×9 surface code.

Similarly a larger grids (13×13, 17×17, ...) may be constructed and errors may be identified using larger vectors and looking for more possible patterns, using the disclosed architecture. Therefore, this architecture is applicable to a more complex surface code logical qubit grid. Furthermore, this architecture does not require additional circuitry as all data qubits controlled by some QC uses the same pipe (by toggling the qubit index).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A quantum controller comprising:
    a plurality of quantum controllers (QCs), wherein each QC is operable to generate:
        a plurality of electromagnetic wave pulses that are applied to one or more qubits to perform a desired logic operation,
        data associated with a pulse processor vector, and
        an operation associated with the pulse processor vector; and
    a quantum control switch comprising a plurality of vector processors, wherein:
        each vector processor of the plurality of vector processors is configured to receive data generated by every QC of the plurality of QCs,
        each vector processor of the plurality of vector processors is configured to perform an operation, generated by a QC of the plurality of QCs, on data generated by one or more QCs of the plurality of QCs,
        the operation performed by each vector processor is independently configurable,
        each pulse processor vector is independently configurable, and
        each vector processor of the plurality of vector processors is configured to return a result of the operation to a corresponding QC of the plurality of QCs.

2. The quantum controller of claim 1, wherein a latency in returning the result of the operation to the corresponding QC is deterministic.

3. The quantum controller of claim 1, wherein the pulse processor vector comprises quantum state data of the corresponding QC.

4. The quantum controller of claim 1, wherein the pulse processor vector comprises metadata, and wherein the metadata comprises at least one of a qubit index, a memory address, and an opcode.

5. The quantum controller of claim 1, wherein the pulse processor vector comprises a quantum state estimate for one or more qubits controlled by the corresponding QC.

6. The quantum controller of claim 5, wherein the quantum state estimate comprises at least one of digital data and analog data representing a qubit readout response.

7. The quantum controller of claim 1, wherein the pulse processor vector comprises qubit interface data according to the corresponding QC, and wherein the qubit interface data validates and integrity of data from the corresponding QC.

8. The quantum controller of claim 1, wherein the quantum control switch comprises a plurality of parsers, and wherein each parser of the plurality of parsers is operable to parse the pulse processor vector from a QC of the plurality of QCs.

9. The quantum controller of claim 1, wherein each vector processor of the plurality of vector processors is configured to perform the operation over a selected set of data from more than one pulse processor vector.

10. The quantum controller of claim 1, wherein the plurality of vector processors operate in parallel.

11. The quantum controller of claim 1, wherein each vector processor of the plurality of vector processors is configured to perform the operation iteratively.

12. The quantum controller of claim 1, wherein each vector processor of the plurality of vector processors is configured to perform the operation according to a stored history of data.

13. The quantum controller of claim 1, wherein the quantum control switch is operable to communicate an error indication to one or more of the plurality of QC's.

14. The quantum controller of claim 1, wherein at least one vector processor of the plurality of vector processors is configured to track and/or correct a quantum error.

15. The quantum controller of claim 14, wherein the at least one vector processor is operable according to a surface code.

16. The quantum controller of claim 14, wherein the at least one vector processor is operable according to a cat code.

17. The quantum controller of claim 14, wherein the quantum error correction algorithm is operable to correct a plurality of errors.

18. The quantum controller of claim 1, wherein a vector processor of the plurality of vector processors is configured to receive an instruction from the corresponding QC of the plurality of QCs, and wherein the operation performed by the vector processor on the pulse processor vectors from one or more QCs is configured according to the instruction.

19. The quantum controller of claim 1, wherein the quantum control switch comprises a plurality of interfaces, and wherein each interface of the plurality of interfaces comprises a duplex port configured to serially communicate data with a QC.

20. The quantum controller of claim 19, wherein each interface of the plurality of interfaces is operable to provide data from a pulse processor vector to a data bus that is operably coupled to every vector processor of the plurality of vector processors.

21. The quantum controller of claim 1, wherein a vector processor of the plurality of vector processors is configured to receive an instruction and a qubit index from a corresponding QC, and wherein the operation is performed according to the instruction and the qubit index.

22. The quantum controller of claim 21, wherein the qubit index is changed while the pulse processor vector from each QC remains the same.

23. The quantum controller of claim 21, wherein the vector processor returns a result that corresponds to the qubit index.

24. A method quantum controller processing comprising:
transmitting an operation and data, associated with a pulse processor vector, from each of a plurality of QCs to a quantum control switch, wherein the quantum control switch comprises a plurality of vector processors;
receiving, by each vector processor of the plurality of vector processors, the data from the plurality of QCs;
performing an operation, in each vector processor of the plurality of vector processors, on the pulse processor vector from one or more QCs of the plurality of QCs;
returning a result of each operation to a corresponding QC of the plurality of QCs; and
applying a plurality of electromagnetic wave pulses, according to each result, to one or more qubits controlled by the corresponding QC of the plurality of QCs.

25. The method of claim 24, wherein the pulse processor vector comprises quantum state data of the corresponding QC.

26. The method of claim 24, wherein the pulse processor vector from each QC comprises a quantum state estimate for each of a plurality of qubits.

27. The method of claim 24, wherein the pulse processor vector comprises qubit interface data according to the corresponding QC.

28. The method of claim 24, wherein the method comprises:
receiving an instruction from the corresponding QC, wherein the operation is configured according to the instruction.

29. The method of claim 24, wherein the method comprises:
receiving the pulse processor vector from each QC serially; and
transmitting the result of the operation to the corresponding QC serially.

30. The method of claim 24, wherein the method comprises:
receiving, by a vector processor, an instruction, quantum state data from all QCs and a qubit index; and
performing the operation, by the vector processor, according to the instruction and the qubit index.

31. The method of claim 30, wherein the method comprises:
changing the qubit index while the pulse processor vector from each QC remains the same.

32. The method of claim 30, wherein the method comprises:
returning a result, from the vector processor, that corresponds to the qubit index.

33. The method of claim 24, wherein the method comprises parsing the pulse processor vector from each QC of the plurality of QCs.

34. The method of claim 24, wherein the operation is performed over a selected set data from more than one pulse processor vector.

35. The method of claim 24, wherein the plurality of vector processors operate in parallel.

36. The method of claim 24, wherein each vector processor of the plurality of vector processors is configured to perform the operation iteratively.

37. The method of claim 24, wherein each vector processor of the plurality of vector processors is configured to perform the operation according to a stored history of data.

38. The method of claim 24, wherein the method comprises communicating an error indication to one or more of the plurality of QC's.

39. The method of claim 24, wherein the operation is a quantum error correction algorithm.

40. The method of claim 39, wherein the quantum error correction algorithm use a surface code.

41. The method of claim 39, wherein the quantum error correction algorithm is operable to correct a plurality of errors.

\* \* \* \* \*